(12) United States Patent
Marshall et al.

(10) Patent No.: US 9,246,918 B2
(45) Date of Patent: Jan. 26, 2016

(54) SECURE APPLICATION LEVERAGING OF WEB FILTER PROXY SERVICES

(71) Applicant: Sky Socket, LLC, Atlanta, GA (US)

(72) Inventors: John Marshall, Atlanta, GA (US); Erich Stuntebeck, Marietta, GA (US); Blake Sorensen, Atlanta, GA (US)

(73) Assignee: AIRWATCH LLC, Atlanta, GA (US)

( * ) Notice: Subject to any disclaimer, the term of this patent is extended or adjusted under 35 U.S.C. 154(b) by 63 days.

(21) Appl. No.: 13/891,551

(22) Filed: May 10, 2013

(65) Prior Publication Data
US 2014/0337925 A1    Nov. 13, 2014

(51) Int. Cl.
*H04L 29/06*  (2006.01)
*H04L 12/58*  (2006.01)
*G06F 21/60*  (2013.01)

(52) U.S. Cl.
CPC .............. *H04L 63/10* (2013.01); *G06F 21/60* (2013.01); *H04L 51/12* (2013.01); *H04L 63/0281* (2013.01); *H04L 63/04* (2013.01); *H04L 63/08* (2013.01); *H04L 63/0861* (2013.01); *H04L 63/20* (2013.01); *H04L 63/145* (2013.01)

(58) Field of Classification Search
CPC ..... H04L 63/08; H04L 63/0861; H04L 63/20; H04L 63/10; H04L 51/12; H04L 63/04; G06F 21/60
USPC .............................. 726/1, 3, 4, 23, 7; 713/168
See application file for complete search history.

(56) References Cited

U.S. PATENT DOCUMENTS

| | | | |
|---|---|---|---|
| 5,574,786 | A  | 11/1996 | Dayan et al. |
| 5,987,609 | A  | 11/1999 | Hasebe |
| 6,021,492 | A  |  2/2000 | May |
| 6,023,708 | A  |  2/2000 | Mendez et al. |
| 6,085,192 | A  |  7/2000 | Mendez et al. |
| 6,131,096 | A  | 10/2000 | Ng et al. |
| 6,131,116 | A  | 10/2000 | Riggins et al. |
| 6,151,606 | A  | 11/2000 | Mendez |
| 6,233,341 | B1 |  5/2001 | Riggins |
| 6,560,772 | B1 |  5/2003 | Slinger |
| 6,708,221 | B1 |  3/2004 | Mendez et al. |
| 6,714,859 | B2 |  3/2004 | Jones |
| 6,726,106 | B1 |  4/2004 | Han et al. |
| 6,727,856 | B1 |  4/2004 | Hill |
| 6,741,232 | B1 |  5/2004 | Siedlikowski et al. |
| 6,741,927 | B2 |  5/2004 | Jones |
| 6,766,454 | B1 |  7/2004 | Riggins |
| 6,779,118 | B1 |  8/2004 | Ikudome et al. |

(Continued)

FOREIGN PATENT DOCUMENTS

| | | |
|---|---|---|
| CA | 2149337 A1 | 6/1994 |
| GB | 2346716 A  | 8/2000 |
| WO | 0241661 A2 | 5/2002 |

OTHER PUBLICATIONS

Asynchrony Software, Inc., "PDA Defense User Guide", 726, 2002.

(Continued)

*Primary Examiner* — Mohammad A Siddiqi
(74) *Attorney, Agent, or Firm* — Thomas | Horstemeyer, LLP

(57) ABSTRACT

Secure application leveraging of a filter proxy service may be provided. In response to receiving a request to access a resource, a filter proxy service may be used to determine whether the request to access the resource is approved. If the request to access the resource is approved, the access to the resource may be allowed to continue.

20 Claims, 3 Drawing Sheets

(56) References Cited

U.S. PATENT DOCUMENTS

| | | |
|---|---|---|
| 6,904,359 B2 | 6/2005 | Jones |
| 6,965,876 B2 | 11/2005 | Dabbiere |
| 6,995,749 B2 | 2/2006 | Friend |
| 7,032,181 B1 | 4/2006 | Farcasiu |
| 7,039,394 B2 | 5/2006 | Bhaskaran |
| 7,039,679 B2 | 5/2006 | Mendez et al. |
| 7,064,688 B2 | 6/2006 | Collins et al. |
| 7,092,943 B2 | 8/2006 | Roese et al. |
| 7,184,801 B2 | 2/2007 | Farcasiu |
| 7,191,058 B2 | 3/2007 | Laird et al. |
| 7,203,959 B2 | 4/2007 | Nachenberg et al. |
| 7,225,231 B2 | 5/2007 | Mendez et al. |
| 7,228,383 B2 | 6/2007 | Friedman et al. |
| 7,275,073 B2 | 9/2007 | Ganji et al. |
| 7,284,045 B1 | 10/2007 | Marl et al. |
| 7,287,271 B1 | 10/2007 | Riggins |
| 7,308,703 B2 | 12/2007 | Wright et al. |
| 7,310,535 B1 | 12/2007 | MacKenzie et al. |
| 7,353,533 B2 | 4/2008 | Wright et al. |
| 7,363,349 B2 | 4/2008 | Friedman et al. |
| 7,363,361 B2 | 4/2008 | Tewari et al. |
| 7,373,517 B1 | 5/2008 | Riggins |
| 7,437,752 B2 | 10/2008 | Heard et al. |
| 7,444,375 B2 | 10/2008 | McConnell et al. |
| 7,447,506 B1 | 11/2008 | MacKenzie et al. |
| 7,447,799 B2 | 11/2008 | Kushner |
| 7,475,152 B2 | 1/2009 | Chan et al. |
| 7,496,957 B2 | 2/2009 | Howard et al. |
| 7,539,665 B2 | 5/2009 | Mendez |
| 7,565,314 B2 | 7/2009 | Borgeson et al. |
| 7,590,403 B1 | 9/2009 | House et al. |
| 7,594,224 B2 | 9/2009 | Patrick et al. |
| 7,603,547 B2 | 10/2009 | Patrick et al. |
| 7,603,548 B2 | 10/2009 | Patrick et al. |
| 7,603,703 B2 | 10/2009 | Craft et al. |
| 7,617,222 B2 | 11/2009 | Coulthard et al. |
| 7,620,001 B2 | 11/2009 | Ganji |
| 7,620,392 B1 | 11/2009 | Maurya et al. |
| 7,650,491 B2 | 1/2010 | Craft et al. |
| 7,660,902 B2 | 2/2010 | Graham et al. |
| 7,665,118 B2 | 2/2010 | Mann et al. |
| 7,665,125 B2 | 2/2010 | Heard et al. |
| 7,685,645 B2 | 3/2010 | Doyle et al. |
| 7,702,322 B1 | 4/2010 | Maurya et al. |
| 7,702,785 B2 | 4/2010 | Bruton, III et al. |
| 7,735,112 B2 | 6/2010 | Kim et al. |
| 7,735,122 B1 | 6/2010 | Johnson et al. |
| 7,739,334 B1 | 6/2010 | Ng et al. |
| 7,752,166 B2 | 7/2010 | Quinlan et al. |
| 7,788,382 B1 | 8/2010 | Jones et al. |
| 7,792,297 B1 | 9/2010 | Piccionelli et al. |
| 7,822,620 B2 * | 10/2010 | Dixon et al. .................... 705/1.1 |
| 7,840,631 B2 | 11/2010 | Farcasiu |
| 7,890,091 B2 | 2/2011 | Puskoor et al. |
| 7,912,896 B2 | 3/2011 | Wolovitz et al. |
| 7,917,641 B2 | 3/2011 | Crampton |
| 7,970,386 B2 | 6/2011 | Bhat et al. |
| 8,001,082 B1 | 8/2011 | Muratov |
| 8,012,219 B2 | 9/2011 | Mendez et al. |
| 8,041,776 B2 | 10/2011 | Friedman et al. |
| 8,046,823 B1 | 10/2011 | Begen et al. |
| 8,060,074 B2 | 11/2011 | Danford et al. |
| 8,069,144 B2 | 11/2011 | Quinlan et al. |
| 8,078,157 B2 | 12/2011 | Maurya et al. |
| 8,094,591 B1 | 1/2012 | Hunter et al. |
| 8,117,344 B2 | 2/2012 | Mendez et al. |
| 8,150,431 B2 | 4/2012 | Wolovitz et al. |
| 8,225,381 B2 | 7/2012 | Lemke |
| 8,745,709 B2 * | 6/2014 | Narendra ............ H04L 63/0853 713/168 |
| 8,910,263 B1 * | 12/2014 | Martini ................ H04L 63/102 726/26 |
| 9,032,520 B2 * | 5/2015 | Banzhof ............ H04L 63/1433 726/22 |
| 2002/0013721 A1 | 1/2002 | Dabbiere et al. |
| 2002/0099829 A1 * | 7/2002 | Richards et al. ............... 709/227 |
| 2003/0110084 A1 | 6/2003 | Eberhard et al. |
| 2003/0204716 A1 | 10/2003 | Rockwood et al. |
| 2004/0098485 A1 * | 5/2004 | Larson et al. .................. 709/227 |
| 2004/0123153 A1 | 6/2004 | Wright et al. |
| 2004/0133486 A1 * | 7/2004 | Markki et al. ................... 705/34 |
| 2004/0181687 A1 | 9/2004 | Nachenberg et al. |
| 2004/0224703 A1 | 11/2004 | Takaki et al. |
| 2005/0246192 A1 | 11/2005 | Jauffred et al. |
| 2006/0107036 A1 * | 5/2006 | Randle et al. .................. 713/153 |
| 2006/0190984 A1 | 8/2006 | Heard et al. |
| 2007/0033397 A1 | 2/2007 | Phillips, II et al. |
| 2007/0136492 A1 | 6/2007 | Blum et al. |
| 2007/0156897 A1 | 7/2007 | Lim |
| 2007/0174433 A1 | 7/2007 | Mendez et al. |
| 2007/0261099 A1 | 11/2007 | Broussard et al. |
| 2007/0288637 A1 | 12/2007 | Layton et al. |
| 2008/0005290 A1 * | 1/2008 | Nykanen et al. ............... 709/222 |
| 2008/0133712 A1 | 6/2008 | Friedman et al. |
| 2008/0134305 A1 | 6/2008 | Hinton et al. |
| 2008/0134347 A1 | 6/2008 | Goyal et al. |
| 2008/0201453 A1 | 8/2008 | Assenmacher |
| 2009/0036111 A1 | 2/2009 | Danford et al. |
| 2009/0144632 A1 | 6/2009 | Mendez |
| 2009/0198997 A1 | 8/2009 | Yeap et al. |
| 2009/0260064 A1 | 10/2009 | McDowell et al. |
| 2009/0300739 A1 | 12/2009 | Nice et al. |
| 2009/0307362 A1 | 12/2009 | Mendez et al. |
| 2010/0005125 A1 | 1/2010 | Mendez et al. |
| 2010/0005157 A1 | 1/2010 | Mendez et al. |
| 2010/0005195 A1 | 1/2010 | Mendez et al. |
| 2010/0023630 A1 | 1/2010 | Mendez et al. |
| 2010/0100641 A1 | 4/2010 | Quinlan et al. |
| 2010/0120450 A1 | 5/2010 | Herz |
| 2010/0144323 A1 | 6/2010 | Collins et al. |
| 2010/0146269 A1 | 6/2010 | Baskaran |
| 2010/0162356 A1 * | 6/2010 | Khosravi et al. .................. 726/2 |
| 2010/0188991 A1 * | 7/2010 | Raleigh ............ G06Q 10/06375 370/252 |
| 2010/0254410 A1 | 10/2010 | Collins |
| 2010/0268844 A1 | 10/2010 | Quinlan et al. |
| 2010/0273456 A1 | 10/2010 | Wolovitz et al. |
| 2010/0299152 A1 | 11/2010 | Batchu et al. |
| 2010/0299362 A1 | 11/2010 | Osmond |
| 2010/0299376 A1 | 11/2010 | Batchu et al. |
| 2010/0299719 A1 | 11/2010 | Burks et al. |
| 2011/0004941 A1 | 1/2011 | Mendez et al. |
| 2011/0082900 A1 | 4/2011 | Nagpal et al. |
| 2011/0113062 A1 | 5/2011 | Quinlan et al. |
| 2011/0145932 A1 | 6/2011 | Nerger et al. |
| 2011/0153779 A1 | 6/2011 | Mendez et al. |
| 2011/0153799 A1 | 6/2011 | Ito |
| 2011/0167474 A1 | 7/2011 | Sinha et al. |
| 2011/0202589 A1 | 8/2011 | Piernot et al. |
| 2011/0225252 A1 | 9/2011 | Bhat et al. |
| 2011/0270799 A1 | 11/2011 | Muratov |
| 2011/0276805 A1 | 11/2011 | Nagpal et al. |
| 2011/0296186 A1 | 12/2011 | Wong et al. |
| 2011/0314145 A1 * | 12/2011 | Raleigh ............... H04L 41/0893 709/224 |
| 2011/0320552 A1 | 12/2011 | Friedman et al. |
| 2012/0005578 A1 | 1/2012 | Hawkins |
| 2012/0015644 A1 | 1/2012 | Danford et al. |
| 2012/0102392 A1 | 4/2012 | Reesman et al. |
| 2012/0198547 A1 | 8/2012 | Fredette et al. |
| 2013/0061307 A1 | 3/2013 | Livne |
| 2013/0152169 A1 | 6/2013 | Stuntebeck |
| 2013/0219493 A1 * | 8/2013 | Banzhof ............. H04L 63/1433 726/22 |
| 2014/0157351 A1 * | 6/2014 | Canning et al. .................... 726/1 |

OTHER PUBLICATIONS

Belani, Eshwar et al., "The CRISIS Wide Area Security Architecture", 726, 1998.

Benaloh, Josh et al., "Patient Controlled Encryption: Ensuring Privacy of Electronic Medical Records", 726, Nov. 13, 2009.

Fox, Armando et al., "Security on the Move: Indirect Authentication Using Kerberos", 726, 1996.

(56) References Cited

OTHER PUBLICATIONS

Menaria, Pankaj et al., "Security in Mobile Database Systems", 707, 726, Mar. 17, 2011.

Pfitzmann, Andreas et al., "Mobile User Devices and Security Modules: Design for Trustworthiness", 726, Feb. 5, 1996.

Steiner, Jennifer , "Kerberos: An Authentication Service for Open Network Systems", 726, Jan. 12, 1988.

Strunk, John et al., "Self-Securing Storage: Protecting Data in Compromised Systems", Symposium on Operating Systems Design and Implementation, 726, 2000.

* cited by examiner

SECURE APPLICATION LEVERAGING OF WEB FILTER PROXY SERVICES

BACKGROUND

A filter proxy service may be leveraged to provide access to various resources for a secure application. Mobile devices may be configured with a management agent to aid in providing security features. The management agent may ensure that certain policies are complied with before providing access to enterprise resources. In some situations, however, resources may not be preconfigured for access conditions either with respect to policies on the device or the content of the resource. Conventional solutions attempt to address this by simply denying access to any such resource instead of providing a way to evaluate whether the resource should be accessible at the time of the request.

SUMMARY

This Summary is provided to introduce a selection of concepts in a simplified form that are further described below in the Detailed Description. This Summary is not intended to identify key features or essential features of the claimed subject matter nor is this Summary intended to be used to limit the claimed subject matter's scope.

Secure application leveraging of a filter proxy service may be provided. In response to receiving a request to access a resource, a filter proxy service may be used to determine whether the request to access the resource is approved. If the request to access the resource is approved, the access to the resource may be allowed to continue.

It is to be understood that both the foregoing general description and the following detailed description are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the detailed description.

BRIEF DESCRIPTION OF THE DRAWINGS

Many aspects of the present disclosure can be better understood with reference to the following diagrams. The drawings are not necessarily to scale. Instead, emphasis is placed upon clearly illustrating certain features of the disclosure. Moreover, in the drawings, like reference numerals designate corresponding parts throughout the several views. In the drawings.

DETAILED DESCRIPTION

Figure 1:
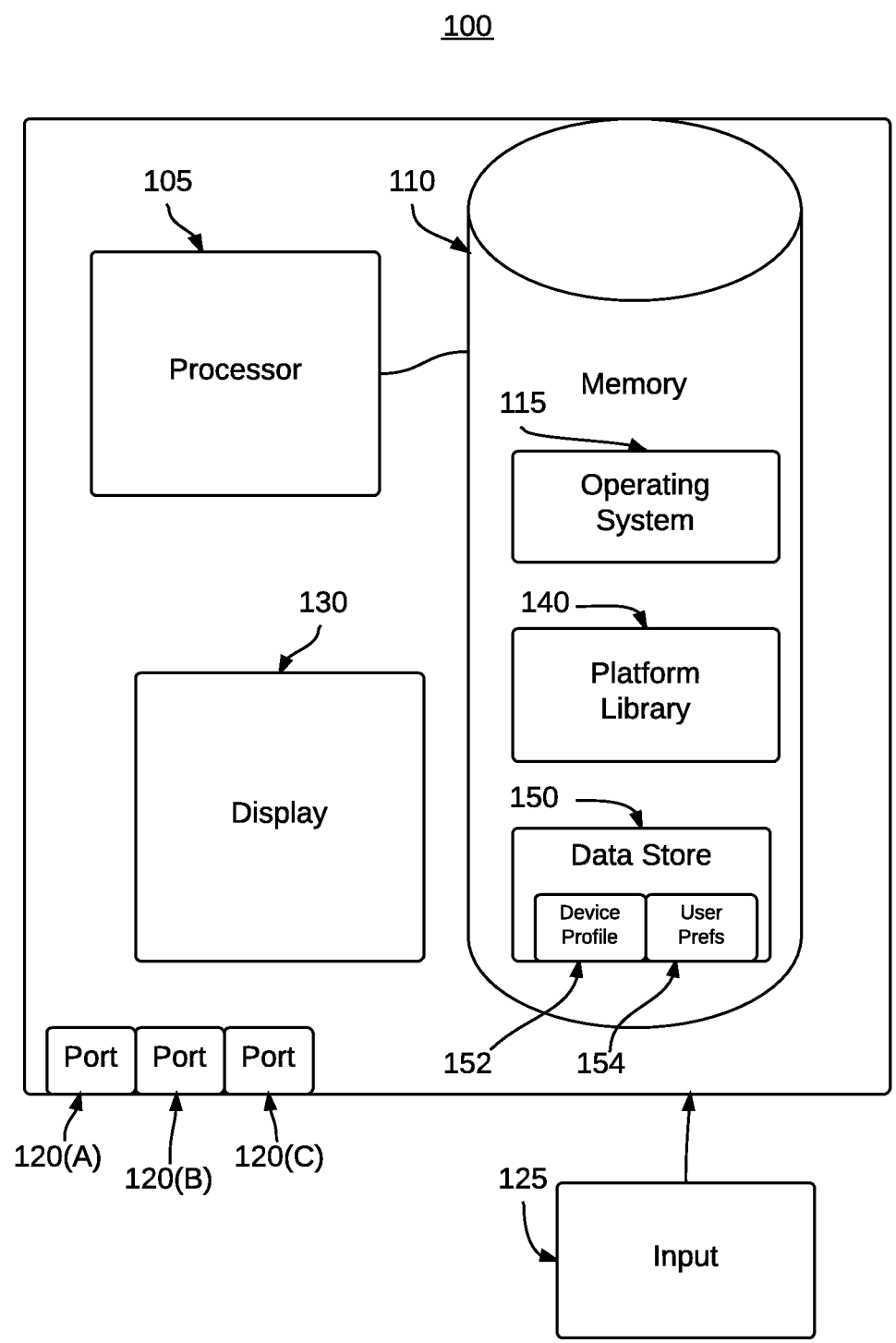
FIG. 1 is a block diagram of a user device.

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

A secured application may be provided to leverage filtering proxy services. As the application requests access to a network resource, such as a website, the request may be forwarded to a management application. The management application may execute on the same device as the application and/or may execute on a remote device. This management application may then determine whether the resource is authorized according to a proxy service, such as may be provided by a web filter proxy service. In some embodiments, the filter proxy service may be hosted by a third party rather than provided by the same organization that is responsible for configuring and operating the management application. Based on the response from the filter proxy service, the management application may provide approval or rejection of the request to access the resource.

In some embodiments, the management application may determine whether the resource is authorized by attempting itself to access the resource via the filter proxy service. This may be particularly advantageous when the management application is executing on a separate device from the secured application, especially when the secured application is executing on a mobile device and the management application executes on a server computer. The management application may thus have more capabilities to analyze the resource request and access attempt for security risks such as malicious software, viruses, exploits, etc. The management application may also have the capability to query several filter proxy services and aggregate the results into a decision as to whether the request by the secured application should be approved or rejected.

In some embodiments, the management application may have more flexibility in inter-operating with filter proxy services due to the requirements imposed by mobile device manufacturers and mobile operating environments. For example, mobile applications are often required to be written in a particular language. In some cases, the filter proxy service may have incompatible requirements, such as an Application Programming Interface (API) that only provides calls in a different language. For example, applications written for the Apple® iPhone® mobile device are developed in the Objective-C language. Furthermore, that platform does not incorporate a Java® runtime engine, so a filter proxy service that only provides a Java® API would be unusable by the mobile device without the intervention of a remotely execute management application.

The management application may also be operative to cache responses from the filter proxy service and respond to the secured application based on the cache response. For example, the management application may receive requests to access resources from a large number of mobile devices associated with an enterprise and may analyze those requests with respect to several filter proxy services to make a decision as to whether the requests should be approved or rejected. Rather than repeating the analysis each time the same request is received, the management application may cache the result for a configurable and/or adaptive time period. For example, when a filter proxy service is known to only update their white/black lists on the first of the month, the management application may cache results from that service until the next update. For another example, results from a filter proxy service that charges a flat monthly fee may be cached for a much shorter time than a filter proxy service that charges a fee based on the number of requests.

The technical effects of some embodiments of this disclosure may include establishing control of access to networks and resources when access lists may not be predefined, and reducing and/or eliminating the burden of predefining access lists to control access to networks and resources. Moreover, the technical effects of some embodiments may include enhancing network access control by assigning specific access rights based on access lists to client devices authorized to access associated network beacons and resources.

To reduce the cost of ownership of user devices and cellular and/or data service charges associated with use of such user devices, a business may implement a "bring your own device" (BYOD) policy to allow an employee to use his/her personal device to access business resources rather than provide the employee with a business owned user device for such purpose. To support such a BYOD policy, a user device administrator (i.e. IT administrator) may manage a group of personally owned user devices, via a management application executed by a management server in communication with the user devices over a network, to provide the user devices with secure access to business resources.

The user device administrator may enroll user devices into the management system to monitor the user devices for security vulnerabilities and to configure the user devices for secure access to business resources. The user device administrator may create and/or configure at least one configuration profile via a user interface provided by the management system. A configuration profile may comprise a set of instructions and/or settings that configure the operations and/or functions of a user device, which may ensure the security of the accessed resources. The user device administrator may, for instance, configure a business email configuration profile by specifying the network address and access credentials of a business email account that the users of the user devices are authorized to access. Other configuration policies may include, but are not limited to, hardware, software, application, function, cellular, text message, and data use restrictions, which may be based at least in part on the current time and/or location of the restricted user device. The user device administrator may thereafter deploy the configuration profiles to specific user devices, such as to groups of user devices of employees with similar roles, privileges and/or titles.

The user devices may also have access to personal configuration profiles that may be created by the users of the user devices. The user devices may, for instance, have access to a personal email configuration profile that was created by a user of the user device to provide access to her personal email account. Thus, a user device enrolled in a BYOD management system may have more than one configuration profile for a given use of the user device, such as a personal email configuration profile and a business email configuration profile that are both used for accessing email accounts on the user device.

The user devices may be instructed to enable and/or disable certain configuration profiles according to authorization rights specified by the user device administrator, such as location and/or time-based authorization rights. For example, a BYOD policy may specify that user devices enrolled in the BYOD management system are authorized for personal use outside of the workday and are authorized for business use during the workday. Similarly, a BYOD device may be restricted to business uses while in work locations and/or prohibited from accessing business resources while outside of secure work locations. To implement such a policy, a user device administrator may instruct the user devices to toggle between personal configuration policies and business configuration policies based on factors such as the current time and/or location associated with the user device. The current time may be based on the current time at the current location of the user device, which may be determined by GPS, Wi-Fi, Cellular Triangulation, etc., or may be based on the current time at a configured primary location associated with the user device, which may be the primary office location of an employee user of the user device. As an example, time-based configuration profile toggling may be provided by instructing a user device to enable business configuration profiles and disable personal configuration profiles while the current time is between 9 AM and 5 PM at the current location of the user device, and to disable business configuration profiles and enable personal configuration profiles while the current time is between 5 PM and 9 AM at the current location of the user device.

FIG. 1 is a block diagram of a user device 100 comprising a processor 105 and a memory 110. Depending on the configuration and type of device, memory 110 may comprise, but is not limited to, volatile (e.g. random access memory (RAM)), non-volatile (e.g. read-only memory (ROM)), flash memory, or any combination. Memory 110 may store executable programs and related data components of various applications and modules for execution by user device 100. Memory 110 may be coupled to processor 105 for storing configuration data and operational parameters, such as commands that are recognized by processor 105.

Basic functionality of user device 100 may be provided by an operating system 115 contained in memory 100. One or more programmed software applications may be executed by utilizing the computing resources in user device 100. Applications stored in memory 110 may be executed by processor 105 (e.g., a central processing unit or digital signal processor) under the auspices of operating system 115. For example, processor 105 may be configured to execute applications such as web browsing applications, email applications, instant messaging applications, and/or other applications capable of receiving and/or providing data.

Data provided as input to and generated as output from the application(s) may be stored in memory 110 and read by processor 105 from memory 110 as needed during the course of application program execution. Input data may be data stored in memory 110 by a secondary application or other source, either internal or external to user device 100, or possibly anticipated by the application and thus created with the application program at the time it was generated as a software application program. Data may be received via any of a plurality of communication ports 120(A)-(C) of user device 100. Communication ports 120(A)-(C) may allow user device 100 to communicate with other devices, and may comprise components such as an Ethernet network adapter, a modem, and/or a wireless network connectivity interface. For example, the wireless network connectivity interface may comprise one and/or more of a PCI (Peripheral Component Interconnect) card, USB (Universal Serial Bus) interface, PCMCIA (Personal Computer Memory Card International Association) card, SDIO (Secure Digital Input-Output) card, NewCard, Cardbus, a modem, a wireless radio transceiver, and/or the like.

User device 100 may also receive data as user input via an input component 125, such as a keyboard, a mouse, a pen, a stylus, a sound input device, a touch input device, a capture device, etc. A capture device may be operative to record user(s) and capture spoken words, motions and/or gestures, such as with a camera and/or microphone. The capture device may comprise any speech and/or motion detection device capable of detecting the speech and/or actions of the user(s).

Data generated by applications may be stored in memory 110 by the processor 105 during the course of application program execution. Data may be provided to the user during application program execution by means of a display 130. Consistent with embodiments of this disclosure, display 130 may comprise an integrated display screen and/or an output port coupled to an external display screen.

Memory 110 may also comprise a platform library 140. Platform library 140 may comprise a collection of functionality useful to multiple applications, such as may be provided by an application programming interface (API) to a software development kit (SDK). These utilities may be accessed by applications as necessary so that each application does not have to contain these utilities thus allowing for memory consumption savings and a consistent user interface.

Furthermore, embodiments of this disclosure may be practiced in conjunction with a graphics library, other operating systems, or any other application program and is not limited to any particular application or system. The devices described with respect to the Figures may have additional features or functionality. For example, user device 100 may also include additional data storage devices (removable and/or non-removable) such as, for example, magnetic disks, optical disks, or tape (not shown).

User device 100 may comprise a desktop computer, a laptop computer, a personal digital assistant, a cellular telephone, a set-top box, a music player, a web pad, a tablet computer system, a game console, and/or another device with like capability.

User device 100 may store in a data store 150 a device profile 152 and a user profile 154. Device profile 152 may comprise, for example, an indication of the current position of user device 100 and/or indications of the hardware, software, and security attributes, which describe user device 100. For instance, device profile 152 may represent hardware specifications of user device 100, version and configuration information of various software program and hardware components installed on user device 100, data transmission protocols enabled on user device 100, version and usage information of various resources stored on user device 100, and/or any other attributes associated with the state of user device 100. The device profile 152 may further comprise data indicating a date of last virus scan of user device 100, a date of last access by an IT representative, a date of last service by the IT representative, and/or any other data indicating maintenance and usage of user device 100. Furthermore, the device profile 152 may comprise indications of the past behavior of associated users, such as resources accessed, charges for resource accesses, and the inventory accessed from such resources. The device profile 152 may also comprise device identifiers that may uniquely identify the user device 100. In some embodiments, the device identifiers may be a unique hardware identifier such as a GUID (Globally Unique Identifier), UUID (Universally Unique Identifier), UDID (Unique Device Identifier), serial number, IMEI (Internationally Mobile Equipment Identity), Wi-Fi MAC (Media Access Control) address, Bluetooth MAC address, a CPU ID, and/or the like, or any combination of two or more such hardware identifiers. In some embodiments, the device identifier may be a unique software identifier such a token or certificate, based at least in part on the aforementioned unique hardware identifiers.

User profile 154 may comprise one or more user identifiers that uniquely identify the user of the user device 100 and/or a listing of factors that may affect the experience of the user. In some embodiments, the user identifiers may include a username, a password, and/or biometric data related to facial recognition, retina recognition, fingerprint recognition, and the like. The user preferences may comprise indications of the user's age, gender, bodily traits, preferred resource types, preferred venue resources, and combinations thereof.

Figure 2:
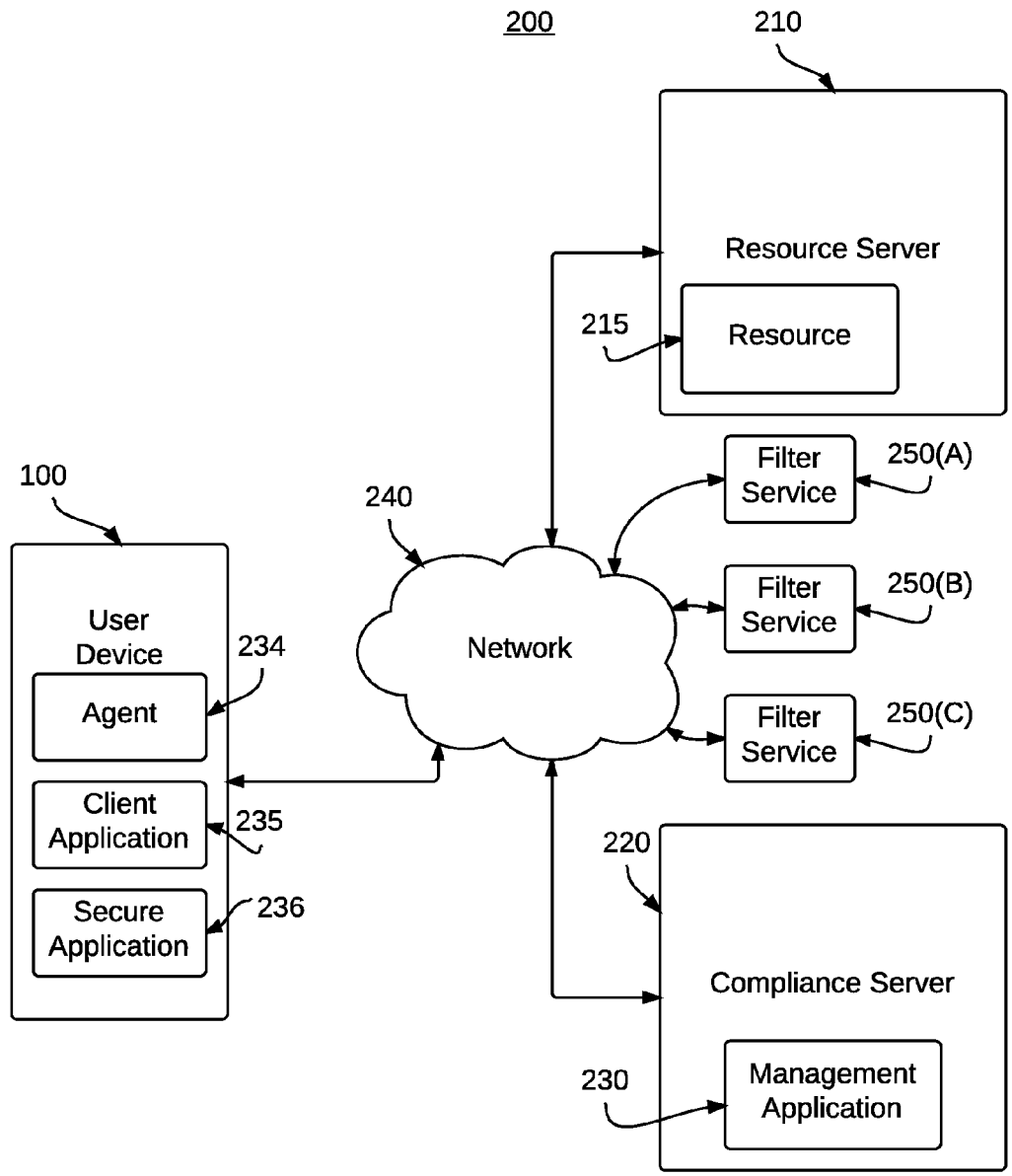
FIG. 2 is a block diagram of an operating environment.

FIG. 2 is a block diagram view of an operating environment 200 comprising user device 100 in communication with a resource server 210, which may provide one or more resource(s) 215, and a compliance server 220, which may provide a management application 230, via a network 240. User device 100, resource server 210, and/or compliance server 220 may be operative to communicate with a plurality of filter proxy services 250(A)-(C) via network 240. In some embodiments, management application 230 and/or filter proxy services 250(A)-(C) may be operative to execute on user device 100 and/or resource server 210.

The compliance server 220 may comprise, for example, cloud-based solutions, server computers and/or any other system providing device management capability. For purposes of convenience, the compliance server 220 is referred to herein in the singular, although it is understood that a plurality of servers may be employed in the arrangements as descried herein. Furthermore, in some embodiments, multiple compliance servers 220 may operate on the same server computer. The components executed on the compliance server 220, for example, may comprise various applications, services, processes, systems, engines, or functionality not disclosed in detail herein.

The compliance server 220 may comprise management application 230 comprising a plurality of compliance rules and/or policies that may be applicable to user device 100. While the management application 230 is shown as within the compliance server 220, the management application 230 may alternately be within the user device 100 and/or remotely located on the resource server 210 and may be remotely updated periodically by compliance server 220 according to common over-the-air (OTA) updating methods. Attempts by user device 100 to perform certain functionality on user device 100 may require user device 100 to be in compliance with one and/or more of the compliance policies/rules. Depending on the sensitivity of a given functionality, different compliance rules may be necessary to ensure that the functionality is adequately restricted. Some functionality may only require ensuring that the proper user is requesting the functionality. Other resources may require compliance with more stringent authorization rules, such as determining whether the functionality is restricted during certain time windows. Accordingly, user device 100 and/or compliance server 220 may be operative to determine whether the user of user device 100 is authorized to perform requested functionality at the time the user requests to perform such functionality.

Compliance server 220 may use the compliance rules to impose hardware restrictions regarding the use of specific wireless devices and specific wireless device features, such as, for instance, cameras, Bluetooth, IRDA, tethering, external storage, a mobile access point, and/or other hardware restrictions. The compliance rules may also impose software restrictions such as the use of specific wireless device operating systems or applications, internet browser restrictions, screen capture functionality, and/or other software restrictions. Mobile device management restrictions included in the compliance rules may comprise encryption requirements, firmware versions, remote lock and wipe functionalities, logging and reporting features, GPS tracking, and/or other mobile device management features.

The compliance server 220 may determine whether the device characteristics of a requesting device (e.g. user device 100) satisfy one or more of the restrictions enumerated in the compliance rules. For example, the compliance server 220 may determine that a requesting device that has a camera, Bluetooth capability, and is executing a specified version of an operating system is compliant with the compliance rules. As another example, the compliance server 220 may determine that a requesting device that is associated with an external storage unit and has screen capture functionality enabled is not compliant with the compliance rules.

In some embodiments, an agent application 234 executed on user device 100 may make the compliance determination based on the device profile, credentials, and/or user preferences. For instance, the agent application 234 may monitor calls by applications, such as a client application 235, and/or a secure application 236, on user device 100 to the operating system 115 of user device 100 to determine whether user device 100 seeks to perform functionality associated with one and/or more of the compliance rules described above. Additionally, the agent application 234 on user device 100 may approve and/or deny the associated functionality requests. For instance, the agent application 234 may instruct operating system 115 on user device 100 to disable the camera of user device 100 in response to a determination that a compliance rule specifies that the camera cannot be used at the time of the request by the user device 100 to operate the camera.

In some embodiments, the agent application 234 executed on user device 100 may rely on compliance server 220 to determine whether a given functionality request on user device 100 is permitted according to the compliance rules. For instance, the agent application may transmit a functionality request, a device profile, credentials, and/or user preferences to compliance server 220 so that compliance server 220 may determine whether user device 100 seeks to perform functionality that may violate a given compliance rule. Additionally, compliance server 220 may approve and/or deny the associated functionality requests. For instance, compliance server 220 may instruct the agent application 234 on user device 100 to instruct operating system 115 to activate a VPN security profile prior to opening a document and/or link.

In some embodiments, the compliance rules may comprise device settings and/or executable instructions that define which functionality the operating system 115 of user device 100 is authorized to perform. Furthermore, the compliance rules may comprise a list of functions, such as those provided by APIs associated with operating system 115 and/or platform library 140, that may be treated as protected functions. Calls to these functions, such as calls to retrieve login credentials, may result in checks by user device 100 and/or compliance server 220 for compliance with the compliance rules.

In some embodiments, the agent 234 may perform a set of ordered operations to accomplish a requested function. These operation sets may be defined by the user device 100 and/or compliance server 220 and may comprise one and/or more operations to determine whether the user device 100 is in compliance with policies from policy store 230. The agent 234 may control at least one respective computing resource of the user device 100. The operations may include configuring at least one respective computing resource of the user device 100 such as restricting access to at least one resource managed by the agent 234.

The Network 240 may comprise, for example, any type of wired and/or wireless network such as a wireless local area network (WLAN), a wireless wide area network (WWAN), Ethernet, fiber-optic network, and/or any other type of wired and/or wireless network now known or later developed. Additionally, the Network 240 may be or include the Internet, intranets, extranets, microwave networks, satellite communications, cellular systems, PCS, infrared communications, global area networks, or other suitable networks, etc., or any combination of such networks.

Figure 3:
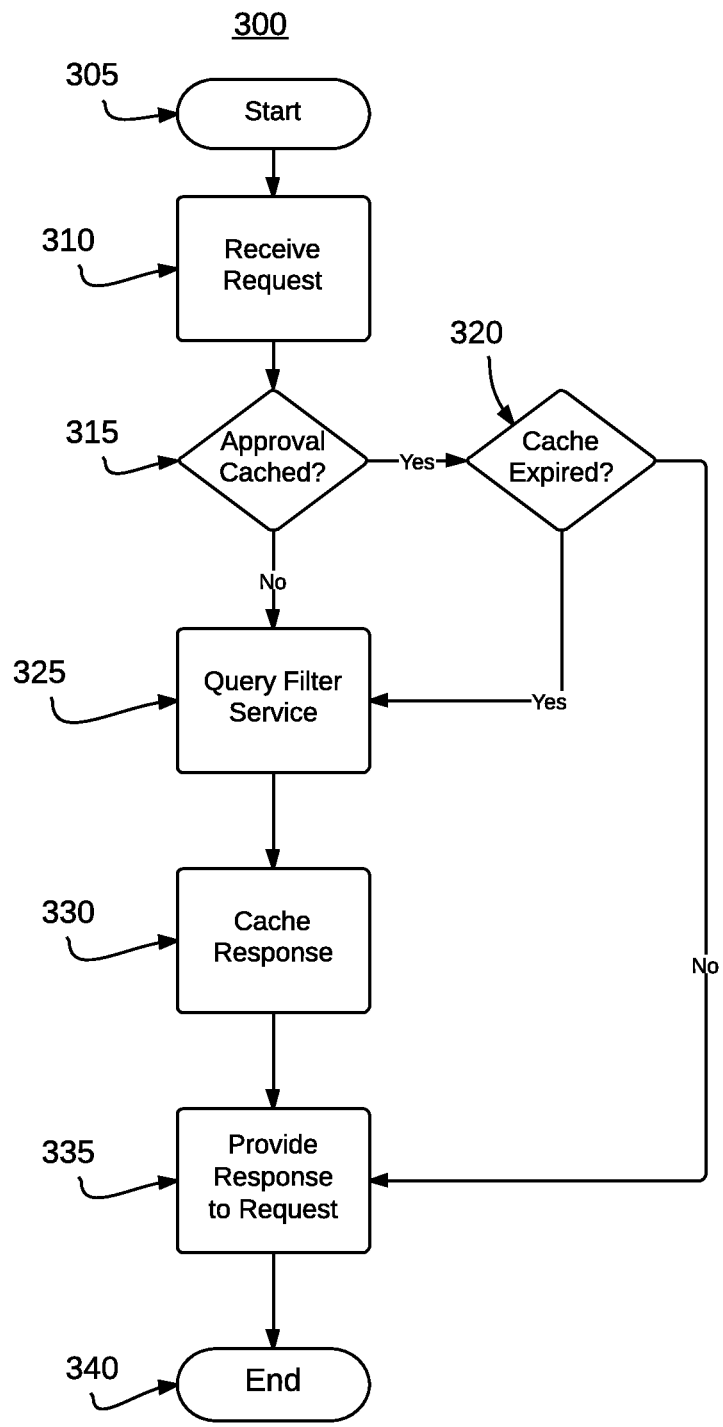
FIG. 3 is a flow chart illustrating a method for providing secure application leveraging of filter proxy services.

FIG. 3 is a flow chart setting forth the general stages involved in a method 300 consistent with embodiments of this disclosure for providing secure application leveraging of a filter proxy service. Method 300 may be implemented using elements of operating environment 200 as described above. Ways to implement the stages of method 300 will be described in greater detail below. Method 300 may begin at starting block 305 and proceed to stage 310 where management application 230 may receive a request to access a resource. For example, secure application 236 may request access to resource 215 on resource server 210. The request may be transmitted to management application 230 for approval before the resource 215 may actually be accessed. As a non-limiting example, secure application 236 may comprise a secure web browser requesting access to a web page resource hosted by resource server 210. Other resources may comprise, for example, hardware resources (e.g., microphone, camera, display, etc.), databases, documents, emails, text messages, voice mails, contact lists, and/or other applications whether executing on user device 100 and/or on other devices such as resource server 210.

From stage 310, method 300 may advance to stage 315 where management application 230 may determine whether an approval decision on a prior request for the resource has been cached. For example, management application 230 may have received a request for access to resource 215 from another user device and stored whether access to the resource 215 had been permitted. In some embodiments, management application 230 may only use cached decisions when the previously requesting device belongs to the same user group as user device 100 and/or comprises substantially the same security policies. For example, a subsequent request from a user device associated with a sales group member may rely on a cached decision for a second user device associated with another member of the sales group while a member of the accounting group may need to have the request for the resource re-evaluated regardless of the cached response.

If an acceptable cache response is found at stage 315, method 300 may advance to stage 320 where management application 230 may determine whether the cache entry has expired. For example, cached decisions may be subject to a configurable and/or adaptive validity duration. In some embodiments, the cache validity duration may differ for different filter proxy services. A default validity duration may also be defined, such as one day.

If no acceptable cache response is found at stage 315, or if the cache response is found to be expired at stage 320, method 300 may advance to stage 325 where management application 230 may query a filter proxy service. For example, management application may use an API call offered by filter proxy service 250(A) to determine whether the requested resource is safe to access. For another example, management application 230 may request that the filter proxy service provide access to the resource directly to the management application 230 and determine whether this request is granted. Safety of the resource 215 may be defined by one or more of a plurality of compliance rules comprising requirements such as content ratings, time and/or location of the requesting device/application, whitelists and/or blacklists, phishing, virus and/or malicious software scans, and/or other threat analyses.

Filter proxy services may provide administrative control over the resources relayed in either direction through the proxy. The filter proxy service may support user and/or device authentication and may produce logs, such as to give information about the requested resources. In some embodiments, the proxy filter proxy service may employ Uniform Resource Locator (URL) and/or Domain Name Service (DNS) blacklists, regular expression scanning, content analysis and/or content keyword filtering. In some embodiments, the filter proxy service may operate as a transparent proxy that intercepts the request for the resource as a normal communication at the network layer without requiring any special client configuration. Clients need not be aware of the existence of the proxy.

In some embodiments, management server 230 may query multiple filter proxy services and aggregate the results. Each of the filter proxy services 250(A)-(C) may provide different and/or the same type of analysis. For example, filter proxy service 250(A) may provide content analysis to determine whether the requested resource complies with acceptable use policies while filter proxy service 250(B) may provide an anti-virus scan. The filter proxy services 250(A)-(C) may be aggregated in a number of ways, such as denying access to the resource if any of the filter proxy services 250(A)-(C) determine that the resource violates a safety and/or compliance policy, siding with a majority when there is disagreement between filter proxy services 250(A)-(C), and/or configuring a weighting for filter proxy services 250(A)-(C) so that a single heavily weighted service may out-vote multiple lower-weighted services.

From stage 325, method 300 may advance to stage 330 where management application 230 may cache a response to the resource request. For example, whether the request to access resource 215 is approved or rejected, that decision may be stored by the management application 230 for use should another request for the same resource be received by the same and/or a different device and/or application.

If the cached response is not expired at stage 320, or once a new response is cached at stage 330, method 300 may advance to stage 335 where management application 230 may provide the response to the request for the resource. For example, if the request is allowed, management application 230 may inform the secure application 236 that it may proceed to access resource 215 directly and/or via one of the filter proxy services 250(A)-(C). In some embodiments, management application 230 may act as a proxy itself and request the resource in order to provide the resource to the requesting application. Method 300 may then end at stage 340.

An embodiment consistent with the disclosure may comprise a system for providing secure application leveraging of a filter proxy service. The system may comprise a memory storage and a processing unit coupled to the memory storage. The processing unit may be operative to receive a request to access a resource, determine, according to a filter proxy service, whether the request to access the resource is approved, and in response to determining that the request to access the resource is approved, allow the access to the resource. The resource may comprise, for example, a database, a document, a web page, a hardware resource, a file, a message, and/or an application Another embodiment consistent with the disclosure may comprise a system for providing secure application leveraging of a filter proxy service. The system may comprise a memory storage and a processing unit coupled to the memory storage. The processing unit may be operative to receive, from a secure application, a request to access a resource, determine, according to at least one filter proxy service, whether the request to access the resource is approved, and, in response to determining that the request to access the resource is approved, allow the secure application to access the resource. The filter proxy service may comprise a service associated with an enterprise with whom the requesting application is associated and/or a third party service.

Yet another embodiment consistent with the disclosure may comprise a system for providing secure application leveraging of a filter proxy service. The system may comprise a memory storage and a processing unit coupled to the memory storage. The processing unit may be operative to receive a request to access a resource from a secure application, determine, according to a filter proxy service, whether the request to access the resource is approved by the management application, and in response to determining that the request to access the resource is approved, allow the secure application to access the resource.

The embodiments and functionalities described herein may operate via a multitude of computing systems, including wired and wireless computing systems, mobile computing systems (e.g., mobile telephones, tablet or slate type computers, laptop computers, etc.). In addition, the embodiments and functionalities described herein may operate over distributed systems, where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of this disclosure may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. The Figures above and their associated descriptions provide a discussion of a variety of operating environments in which embodiments of this disclosure may be practiced. However, the devices and systems illustrated and discussed with respect to the Figures are for purposes of example and illustration and are not limiting of a vast number of computing device configurations that may be utilized for practicing embodiments of this disclosure as described herein.

The term computer readable media as used herein may include computer storage media. Computer storage media may include volatile and nonvolatile, removable and non-removable media implemented in any method or technology for storage of information, such as computer readable instructions, data structures, program modules, or other data. System memory, removable storage, and non-removable storage are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

A number of applications and data files may be used to perform processes and/or methods as described above. The aforementioned processes are examples, and a processing unit may perform other processes. Other programming modules that may be used in accordance with embodiments of this disclosure may include electronic mail, calendar, and contacts applications, data processing applications, word processing applications, spreadsheet applications, database applications, slide presentation applications, drawing or computer-aided application programs, etc.

Generally, consistent with embodiments of this disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of this disclosure may also be practiced in distributed computing environments where tasks are performed by remote processing devices that are linked through a communications network. In a distributed computing environment, program modules may be located in both local and remote memory storage devices.

Furthermore, embodiments of this disclosure may be practiced in an electrical circuit comprising discrete electronic elements, packaged or integrated electronic chips containing logic gates, a circuit utilizing a microprocessor, or on a single chip containing electronic elements or microprocessors. Embodiments of this disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of this disclosure may, for example, be implemented as a computer process and/or method, a computing system, an apparatus, device, or appliance, and/or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of this disclosure may be practiced via a system-on-a-chip (SOC) where each and/or many of the elements described above may be integrated onto a single integrated circuit. Such an SOC device may include one or more processing units, graphics units, communications units, system virtualization units and various application functionalities, all of which may be integrated (or "burned") onto the chip substrate as a single integrated circuit. When operating via an SOC, the functionality, described herein, with respect to training and/or interacting with any element may operate via application-specific logic integrated with other components of the computing device/system on the single integrated circuit (chip).

Embodiments of this disclosure are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

All rights including copyrights in any code included herein are vested in and the property of the Assignee. The Assignee retains and reserves all rights in the code included herein, and grants permission to reproduce the material only in connection with reproduction of the granted patent and for no other purpose.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method for controlling access of client devices enrolled in a management system, comprising:
   receiving, from a secure application executing on a client device, a first request to access a resource, the secure application being provisioned as part of the management system separately from a client application;
   in response to the first request, transmitting, from the client device, a second request for a compliance server to provide an indication that an aggregate result of content analysis from a plurality of filter proxy services determines that the resource complies with an acceptable use policy;
   obtaining, in the client device, the indication that the aggregate result determines that the resource complies with the acceptable use policy; and
   in response to the indication that the aggregate result determines that the resource complies with the acceptable use policy, granting, in the client device, the first request to access the resource.

2. The method of claim 1, wherein the resource comprises at least one of a database, a document, a web page, a software resource, a hardware resource, a file, a message, or an application.

3. The method of claim 1, wherein the first request is received using a management application in the client device.

4. The method of claim 1, wherein granting the first request to access to the resource comprises allowing the secured application to cause the client device to request the resource.

5. The method of claim 1, further comprising causing, using the client device, the indication that the resource complies with the acceptable use policy to be cached.

6. The method of claim 1, wherein the indication that the aggregate result of content analysis from the plurality of filter proxy services further indicates that a majority of the plurality of filter proxy services determined that the resource complies with the acceptable use policy.

7. The method of claim 1, wherein the indication that the aggregate result of content analysis from the plurality of filter proxy services further indicates that a weighted combination of the filter proxy services determined that the resource complies with the acceptable use policy.

8. The method of claim 1, further comprising:
   providing, to the client device, an agent application in addition to the secure application, wherein the agent application:
      monitors requests to access resources; and
      determines whether the requests should be approved based on one or more compliance rules that specify acceptable device characteristics.

9. A system for controlling access of client devices enrolled in a management system comprising:
   a client device comprising a processor; and
   a memory storage that is accessible to the processor, wherein the memory storage comprises a plurality of program instructions that, upon execution by the processor, cause the processor to at least:
      receive, from a secure application, a first request to access a resource, the secure application being provisioned as part of the management system separately from a client application;
      in response to the first request, transmit a second request for a compliance server to provide an indication that an aggregate result of content analysis from a plurality of filter proxy services determines that the resource complies with an acceptable use policy;
      obtain the indication that the aggregate result determines that the resource complies with the acceptable use policy; and
      in response to the indication that the aggregate result determines that the resource complies with the acceptable use policy, grant the first request to access the resource.

10. The system of claim 9, wherein at least one of the plurality of filter proxy services comprises a third party service relative to at least one party that operates the client device and the client device.

11. The system of claim 9, wherein the plurality of program instructions, upon execution by the processor, further cause the processor to at least initiate an application programming interface (API) call associated with the filter proxy service.

12. The system of claim 9, wherein the indication that the aggregate result of content analysis from the plurality of filter proxy services further indicates that a majority of the plurality of filter proxy services determined that the resource complies with the acceptable use policy.

13. The system of claim 9, wherein the memory storage further comprises a plurality of program instructions that, upon execution by the processor, cause the processor to at least:
   provide, to the client device, an agent application in addition to the secure application, wherein the agent application authorizes a user of the client device to access the resource based on biometric data.

14. A non-transitory computer-readable medium that stores a set of instructions that, when executed by a processor, cause the processor to perform a method for controlling access of client devices enrolled in a management system, comprising:
   receiving, from a secure application, a first request to access a resource, the secure application being provisioned as part of the management system;
   in response to the first request, transmitting a second request for a compliance server to provide an indication that an aggregate result of content analysis from a plurality of filter proxy services determines that the resource complies with an acceptable use policy;
   obtaining the indication that the aggregate result determines that the resource complies with the acceptable use policy; and
   in response to the indication that the aggregate result determines that the resource complies with the acceptable use policy, granting the first request to access the resource.

15. The non-transitory computer-readable medium of claim 14, wherein the indication comprises a prior response associated with the resource that is cached.

16. The non-transitory computer-readable medium of claim 14, wherein the resource comprises a database.

17. The non-transitory computer-readable medium of claim 14, wherein the resource comprises a hardware resource.

18. The non-transitory computer-readable medium of claim 14, wherein granting the first request to access the resource comprises allowing the secured application to cause the processor to request the resource.

19. The non-transitory computer-readable medium of claim 14, wherein the indication that the aggregate result of content analysis from the plurality of filter proxy services further indicates that a weighted combination of the filter proxy services determined that the resource complies with the acceptable use policy.

20. The computer-readable medium of claim 14, wherein the instructions, when executed, cause the process to perform additional steps comprising:
- receiving the second request using a management application; and
- communicating, by the management application, with the plurality of filter proxy services to determine whether the resource complies with the acceptable use policy, wherein the client device would be unable to independently communicate with each of the filter proxy services; and
- calculating, by the management application based on the responses from the plurality of filter proxy services, the aggregate result.

* * * * *